United States Patent
Parthasarathy et al.

(10) Patent No.: US 8,131,932 B2
(45) Date of Patent: Mar. 6, 2012

(54) METHOD AND SYSTEM FOR FAST RETRIEVAL OF RANDOM UNIVERSALLY UNIQUE IDENTIFIERS THROUGH CACHING AND PARALLEL REGENERATION

(75) Inventors: Ramesh Parthasarathy, Bangalore (IN); Bhavanishankara Sapaliga, Bangalore (IN); Binod P G, Bangalore (IN)

(73) Assignee: Oracle America, Inc., Redwood City, CA (US)

( * ) Notice: Subject to any disclaimer, the term of this patent is extended or adjusted under 35 U.S.C. 154(b) by 380 days.

(21) Appl. No.: 12/407,571

(22) Filed: Mar. 19, 2009

(65) Prior Publication Data

US 2010/0241804 A1 Sep. 23, 2010

(51) Int. Cl.
*G06F 12/00* (2006.01)
(52) U.S. Cl. ...................................... 711/118; 711/154
(58) Field of Classification Search .................. 711/118, 711/154
See application file for complete search history.

(56) References Cited

U.S. PATENT DOCUMENTS

| 6,003,066 A * | 12/1999 | Ryan et al. ..................... 709/201 |
| 6,973,473 B1 * | 12/2005 | Novaes et al. ................. 709/201 |
| 2008/0069361 A1 * | 3/2008 | Cho et al. ....................... 380/277 |

* cited by examiner

*Primary Examiner* — Hashem Farrokh
(74) *Attorney, Agent, or Firm* — Osha • Liang LLP (57) ABSTRACT

In general, the invention relates to a system that includes a UUID cache and a UUID caching mechanism. The UUID caching mechanism is configured to, using a first thread, monitor the number of UUIDs stored in the UUID cache, determine that the number of UUIDs stored in the UUID cache is less than a first threshold, request a first set of UUIDs from a UUID generator, receive the first set of UUIDs from the UUID generator, and store the first set of UUIDs received from the UUID generator in the UUID cache. The UUID caching mechanism is further configured to provide a second set of UUIDs to a first application using a second thread, where at least one of the UUIDs in the second set of UUIDs is from the first set of UUIDs, and where the first thread and the second thread execute concurrently.

20 Claims, 5 Drawing Sheets

METHOD AND SYSTEM FOR FAST RETRIEVAL OF RANDOM UNIVERSALLY UNIQUE IDENTIFIERS THROUGH CACHING AND PARALLEL REGENERATION

BACKGROUND

A universally unique identifier (UUID) is an identifying number meeting a standard used in software development to uniquely identify information. In distributed systems, applications often require the use of UUIDs for uniquely identifying information. For example, UUIDs may be used to identify messages and packets that are exchanged between systems. Accordingly, these UUIDs must be unique across space and time to provide accurate identification of the data for which they are associated.

A UUID is typically (though not always) a sixteen byte number generated by a computer system. Many tools for generating UUIDs exist, using a variety of algorithms. In choosing a tool to generate UUIDs, it is often necessary to consider the time required to generate UUIDs and the preferred degree of randomness of the generated numbers. For example, an algorithm that provides a greater degree of randomness often times requires more time to generate the UUIDs. Alternatively, an algorithm that is more time efficient generally produces UUIDs that are less likely to be random. Accordingly, when an application requires the use of UUIDs, executing the application often takes more time to execute if the application calls a UUID generator that provides a higher degree of randomness over a UUID generator that provides a lower degree of randomness. The result is that developers must choose between a more efficient generator to save time or a more effective generator to produce a more reliable result.

SUMMARY

In general, in one aspect, the invention relates to a system. The system includes a universally unique identifier (UUID) cache, wherein the UUID cache is located on a computer readable storage medium and is configured to store a plurality of UUIDs; and a UUID caching mechanism. The UUID caching mechanism is configured to: replenish UUIDs in the UUID cache using a first thread by: monitoring the number of UUIDs stored in the UUID cache, determining that the number of UUIDs stored in the UUID cache is less than a first threshold, requesting a first set of UUIDs from a UUID generator, receiving the first set of UUIDs from the UUID generator, and storing the first set of UUIDs received from the UUID generator in the UUID cache, and provide a second set of UUIDs to a first application of a plurality of applications using a second thread, wherein at least one of the UUIDs in the second set of UUIDs is from the first set of UUIDs, and wherein the first thread and the second thread execute concurrently.

In general, in one aspect, the invention relates to a computer readable medium comprising computer readable program code embodied therein, for causing a computer system to: replenish universally unique identifiers (UUIDs) in the UUID cache using a first thread by: monitoring the number of UUIDs stored in the UUID cache, determining that the number of UUIDs stored in the UUID cache is less than a first threshold, requesting a first set of UUIDs from a UUID generator, receiving the first set of UUIDs from the UUID generator, and storing the first set of UUIDs received from the UUID generator in the UUID cache, and provide a second set of UUIDs to a first application of a plurality of applications using a second thread, wherein at least one of the UUIDs in the second set of UUIDs is from the first set of UUIDs, and wherein the first thread and the second thread execute concurrently.

In general, in one aspect, the invention relates to a method for providing universally unique identifiers (UUIDs), comprising: (a) monitoring the number of UUIDs stored in the UUID cache, (b) determining that the number of UUIDs stored in the UUID cache has fallen below a first threshold, (c) requesting a first set of UUIDs from a UUID generator, (d) receiving the first set of UUIDs from the UUID generator, (e) storing the first set UUIDs received from the UUID generator in the UUID cache, (f) receiving a request from a first application of a plurality of applications for a second set of UUIDs, (g) identifying the second set of UUIDs in the UUID cache, wherein at least one UUID in the second set of UUIDs is in from the first set of UUIDs, (h) returning the second set of UUIDs from the UUID cache to the first application, and (i) purging the second set of UUIDs from the UUID cache, wherein steps (a)-(e) are performed by a first thread, steps (f)-(i) are performed by a second thread, and the first thread and the second thread execute concurrently.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for fast retrieval of random UUIDs through caching and parallel regeneration. Specifically, embodiments of the invention provide a system and method for providing UUIDs from a UUID cache to an application and replenishing the UUID cache from a UUID generator simultaneously, such that the time required for the application to retrieve UUIDs is not dependent on the time required to generate the UUIDs.

In one embodiment of the invention a UUID is considered unique if the UUID may be used to identify a particular piece of data within the space in which the UUID is used. Accordingly, the UUID does not need to be unique with respect to all UUIDs in existence. Rather, the UUID only needs to be unique as compared to all other UUIDs generated for use in the same space. For example, if UUIDs are being generated and used by a set of inter-related applications, then the UUIDs need to be unique such that the same UUID is not generated by two (or more) of the set of inter-related applications. However, the generated UUIDs do not need to be unique with respect to UUID generated by other applications not within the set of inter-related applications.

Figure 1:
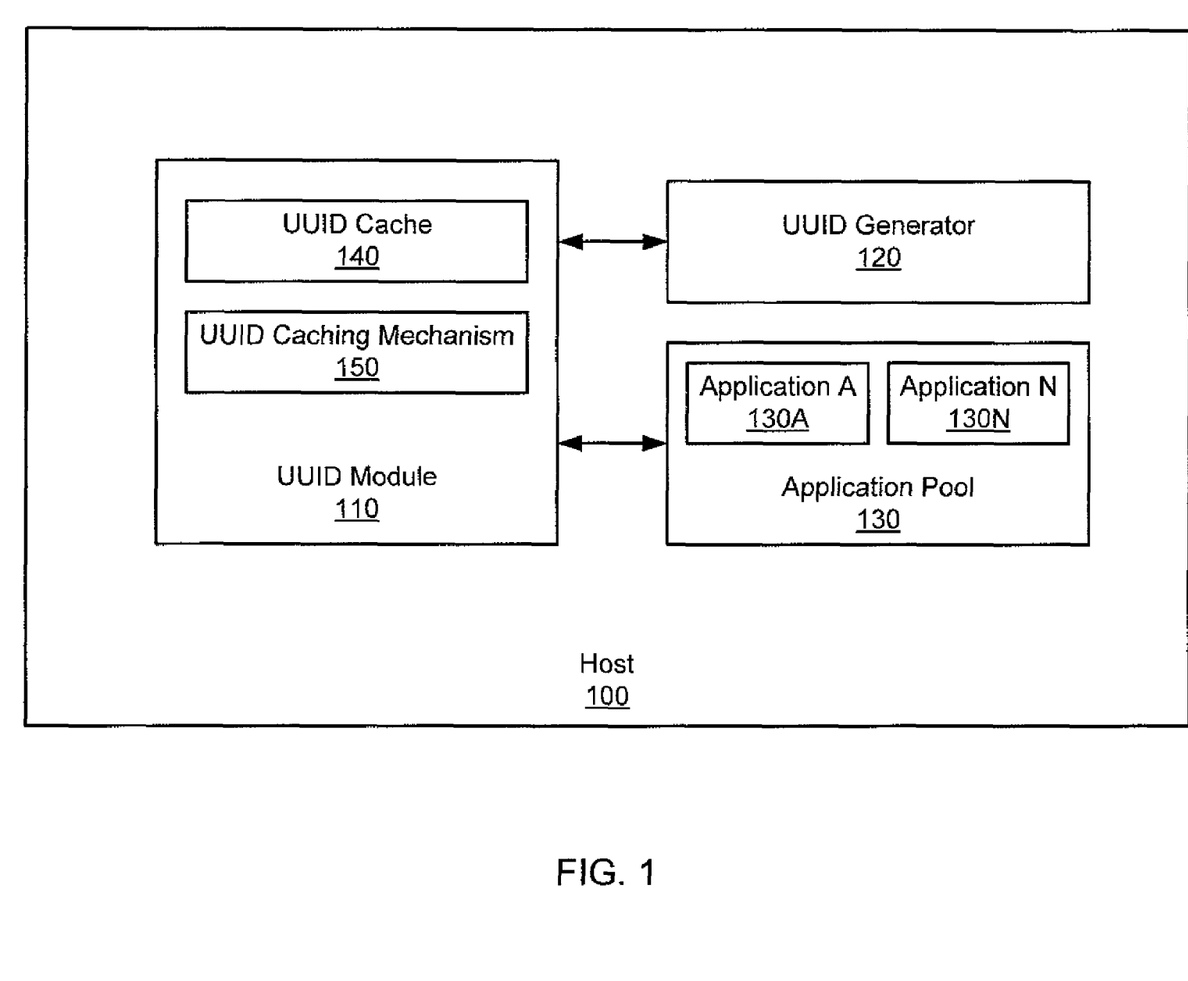
FIG. 1 shows a host system in accordance with one or more embodiments of the invention.

FIG. 1 shows a host system according to one or more embodiments of the invention. The host (100) includes a UUID Module (110), a UUID Generator (120), and an Application Pool (130). According to one or more embodiments of the invention, the UUID Module (110), the UUID Generator (120), and the Application Pool (130) may be included on one system, or may be distributed across multiple systems.

The UUID Generator (120) is configured to generate and provide UUIDs. According to one or more embodiments of the invention, the UUID Generator (120) may be any tool that generates and provides UUIDs in a system. For example, the Java™ UUID Generator (JUG), the Java™ Development Kit (JDK) API, and UUID.randomUUID are examples of UUID Generators. Java™ is a registered trademark of Sun Microsystems, Inc. located in Santa Clara, Calif. Those skilled in the art will appreciate that other UUID Generators exist and may be used with one or more embodiments of the invention. According to one or more embodiments of the invention, the UUID Generator (120) is operatively connected to the UUID Module (110). In one or more embodiments of the invention, the UUID Generator (120) may be part of the UUID Module (110). According to one or more embodiments of the invention, the UUID generator (120) may return generated UUIDs to the UUID Module (110) as they are generated (i.e., one at a time), after generating all the UUIDs (i.e., all at one time), after a specified number of UUIDs have been generated, or any combination thereof.

The Application Pool (130) may include one or more Applications (130A, 130N). Further, according to one or more embodiments of the invention, applications may be distributed across multiple systems. Each of the Applications (130A, 130N) may require the use of UUIDs during execution. The Application Pool (130) may obtain the UUIDs from the UUID module to which they are operatively connected.

According to one or more embodiments of the invention, the UUID Module (110) may include a UUID Cache (140) and a UUID Caching Mechanism (150). According to one or more embodiments of the invention, the UUID Module (110) includes functionality to provide UUIDs to Applications in the system (i.e., Application A, Application N), as well as maintain a UUID Cache (140), which stores UUIDs that are provided to, or made available to, an application upon request. The UUID Cache (140) is located on a computer readable storage medium and stores UUIDs. In one or more embodiments of the invention, the computer readable storage medium may include, but is not limited to, flash-type storage devices (e.g., NAND-Flash memory, NOR-Flash memory, etc.), hard disks (i.e., non-volatile storage devices which store digitally encoded data on rotating platters with magnetic surfaces), hybrid storage devices (i.e., storage devices that include two or more types of storage media, for example, flash-type medium and magnetic media), any other computer readable storage medium, or any combination thereof. According to one or more embodiments of the invention, the UUIDs may be stored in the UUID Cache (140) in a table or any other suitable data structure.

According to one or more embodiments of the invention, the UUID Caching Mechanism (150) is configured to monitor the UUID Cache (140) and replenish the UUID Cache (140) when necessary. When the number of UUIDs stored in the UUID Cache (140) falls below a low threshold, the UUID Caching Mechanism (150) requests additional UUIDs from the UUID Generator (120). According to one or more embodiments of the invention, the UUID Caching Mechanism (150) may identify a high threshold (i.e., the maximum number of UUIDs to be stored in the UUID Cache (140) at a given time). According to one or more embodiments of the invention, the high threshold may also correspond to the number of UUIDs which the UUID Cache (140) includes when it is replenished. Accordingly, the UUID Caching Mechanism (150) may request a number of UUIDs from the UUID generator to reach the high threshold (or to reach a lower number). According to one or more embodiments of the invention, the low threshold may also be set by determining the rate at which UUIDs are used by applications in the Application Pool (130) and the time required to generate UUIDs by the UUID Generator (120). Accordingly, the UUID Caching Mechanism (150), using the aforementioned information, may ensure that the number of UUIDs in the UUID Cache (140) never falls below the low threshold.

According to one or more embodiments of the invention, the high threshold and the low threshold are stored within the system and are accessible by the UUID caching mechanism (150). According to one or more embodiments of the invention, the low threshold and the high threshold may be generated dynamically. For example, the low threshold and the high threshold may be refreshed periodically according to historical rate of UUIDs used by applications. For example, the UUID caching mechanism (150) may monitor the number of UUIDs requested by applications in the system. The duration of the monitoring may vary based on the implementation of one or more embodiments of the invention. The result of the monitoring is the determination of a historical rate defined as the number of UUIDs requested by a application over a unit of time, e.g., UUIDs requested/minute, etc. Over time the historical rates may be updated as new information is obtained via the monitoring of the UUID caching mechanism (150).

Regarding the low threshold, the minimum number of UUIDs required to be stored in the UUID cache (140) at any given time may vary depending on the historical rate(s) of UUIDs requested by the applications accessing the UUID cache. For example, if historically, applications in a system request UUIDs at a slow rate, then the low threshold may be lowered. Alternatively, when the rate of UUIDs requested by the applications in the system increases, the UUID caching mechanism (150) may increase the low threshold.

Regarding the high threshold, the maximum number of UUIDs to be stored in the UUID cache (140) at any given time may vary depending on the historical rate(s) of UUIDs requested by the applications accessing the UUID cache. For example, if historically, applications in a system request UUIDs at a high rate, the high threshold may be raised to a relatively high level. Further, according to one or more embodiments of the invention, the high threshold may be altered by other factors in the system, such as available storage capacity in the UUID cache (140).

The UUID Caching Mechanism (150) also includes the functionality to interface with the applications (130A, 130N). According to one or more embodiments of the invention, the UUID Caching Mechanism (150) is configured to receive requests for a number of UUIDs, identify UUIDs from the UUID Cache (140), and send the UUIDs to the requesting application(s). To ensure that the UUIDs issued to one requesting application are not issued to another requesting application, the UUIDs issued to a first requesting application are removed, invalidated, or otherwise marked in the UUID cache (140). For example, the UUIDs may be erased from the UUID cache (140), or otherwise made unavailable to concurrently or subsequently requesting applications in the system.

According to one or more embodiments of the invention, the UUID Module (110) and the UUID Generator (120) communicate using at least one thread, and The Application Pool (130) communicates with the UUID Module (110) using at least one other thread. For example, each application (130A, 130N) may communicate with the UUID Module (110) using a separate thread. Further, any combination of these threads may execute concurrently. Accordingly, while the UUID Module (110) is interfacing with the UUID Generator (120) to replenish the UUID Cache (140) using a first thread, the UUID Module (110) may respond to requests from applications (130A)-(130N) by returning UUIDs to the applications (130A)-(130N) using a second thread (or using multiple threads). In one or more embodiments of the invention, the term "concurrently" refers to the execution of at least two threads such that during at least a period of time a first thread is executing a second thread is also executing.

Figure 2:
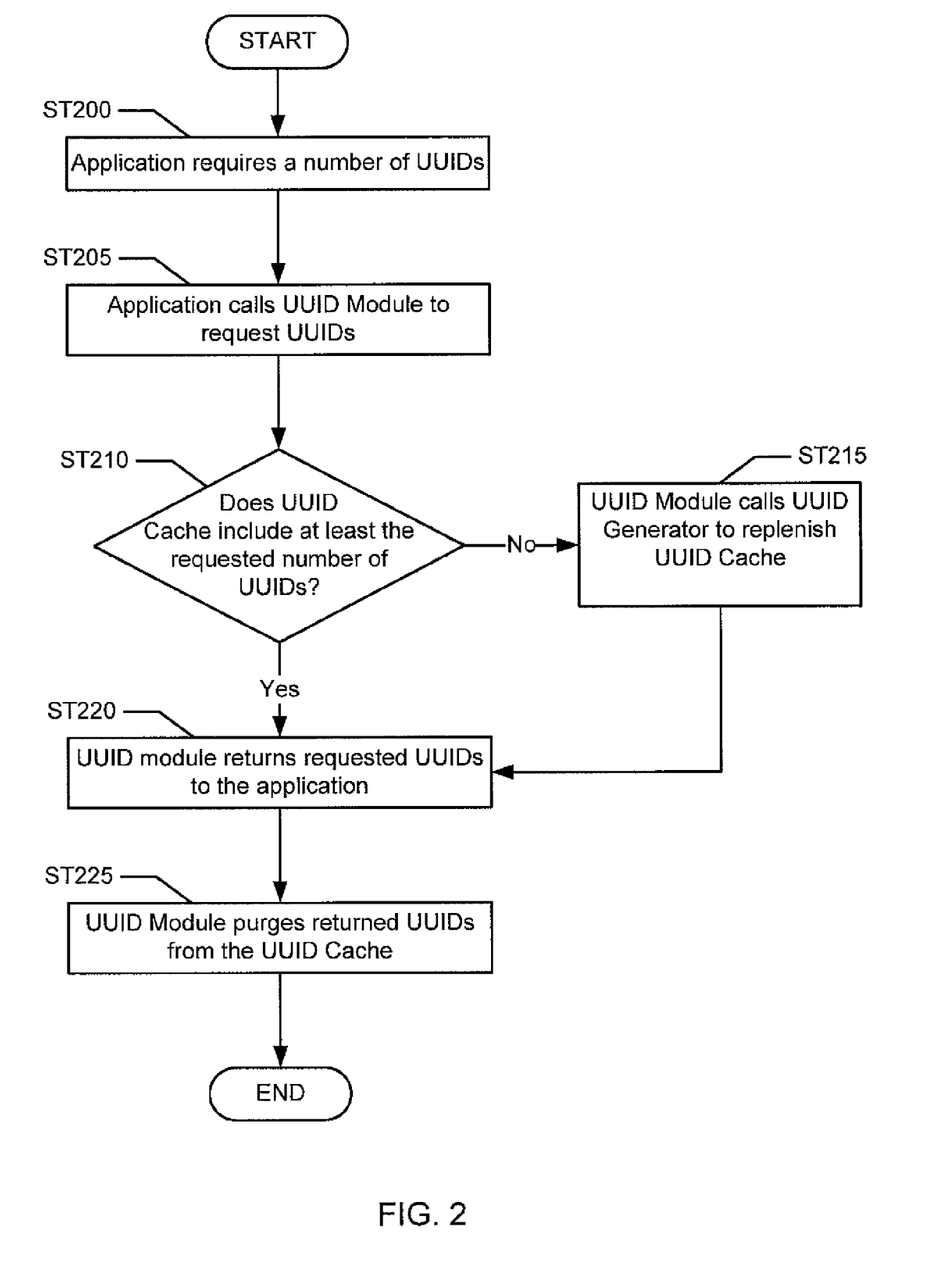
FIGS. 2-3 show flowcharts in accordance with one or more embodiments of the invention.

FIG. 2 shows a flowchart according to one or more embodiments of the invention. Specifically, FIG. 2 shows a method for replenishing UUIDs in the UUID cache. Further, according to one or more embodiments of the invention, the UUID cache may be empty, and thus, the UUID cache may be warmed up by requesting an initial set of UUIDs from the UUID generator to populate the UUID cache. While the various steps in this flowchart are presented and described sequentially, one of ordinary skill will appreciate that some or all of the steps may be executed in different orders, may be combined or omitted, and some or all of the steps may be executed in parallel.

At Step 200, an application requires a number of UUIDs. According to one or more embodiments of the invention, an application may require one UUID or multiple UUIDs. At Step 205, the application calls the UUID Module to request the requisite number of UUIDs.

At Step 210, a determination is made whether the UUID Cache includes at least the requested number of UUIDs. According to one or more embodiments of the invention, determining whether the UUID cache includes at least the requested number of UUIDs includes taking into consideration a low threshold of UUIDs that should be stored in the cache at any given time (i.e., the low threshold described above). Accordingly, in one or more embodiments of the invention, even when there are at least the requested number of UUIDs in the UUID Cache, if spending these UUIDs results in the number of UUIDs stored in the UUID Cache to fall below a low threshold, the flowchart may continue at Step 215 to replenish the UUID Cache prior to issuing the UUIDs. According to one or more embodiments of the invention, the determination is made using the historical rate(s) of UUIDs requested by the applications accessing the UUID cache.

When the UUID Cache does not include the requested number of UUIDs, at Step 215, the UUID Module calls the UUID Generator to replenish the UUIDs. According to one or more embodiments of the invention, the UUID Caching Mechanism within the UUID Module calls the UUID Generator. Replenishing the UUID cache is described in further detail in FIG. 3. According to one or more embodiments of the invention, replenishing the cache includes requesting a sufficient number of UUIDs to reach a high threshold or to reach another number between the low and high threshold.

At Step 220, the UUID Cache includes the requested number of UUIDs. Accordingly, the UUID Module returns the requested UUIDs to the requesting application. At Step 225, the UUID module removes, or otherwise invalidates, the UUIDs sent to the application to ensure that the UUIDs sent to the application are not sent again, to the same application or to any other applications. Thus, the UUID module ensures that the cached UUIDs are not re-used. According to one or more embodiments of the invention, removing the sent UUIDs involves erasing the sent UUIDs from the UUID cache. Further, removing the UUIDs may include any method that renders the sent UUIDs unusable after they are returned to an application. Accordingly, removing the UUIDs may include rendering them invalid when they are identified as UUIDs that are returned to the requesting application.

While FIG. 2 shows a method of one application requesting and receiving UUIDs from a UUID Module, it is important to note that the method may be implemented concurrently by multiple applications at the same time. For example, according to one or more embodiments of the invention, each application may communicate with the UUID Module using a separate thread and these separate threads may execute concurrently.

Figure 3:
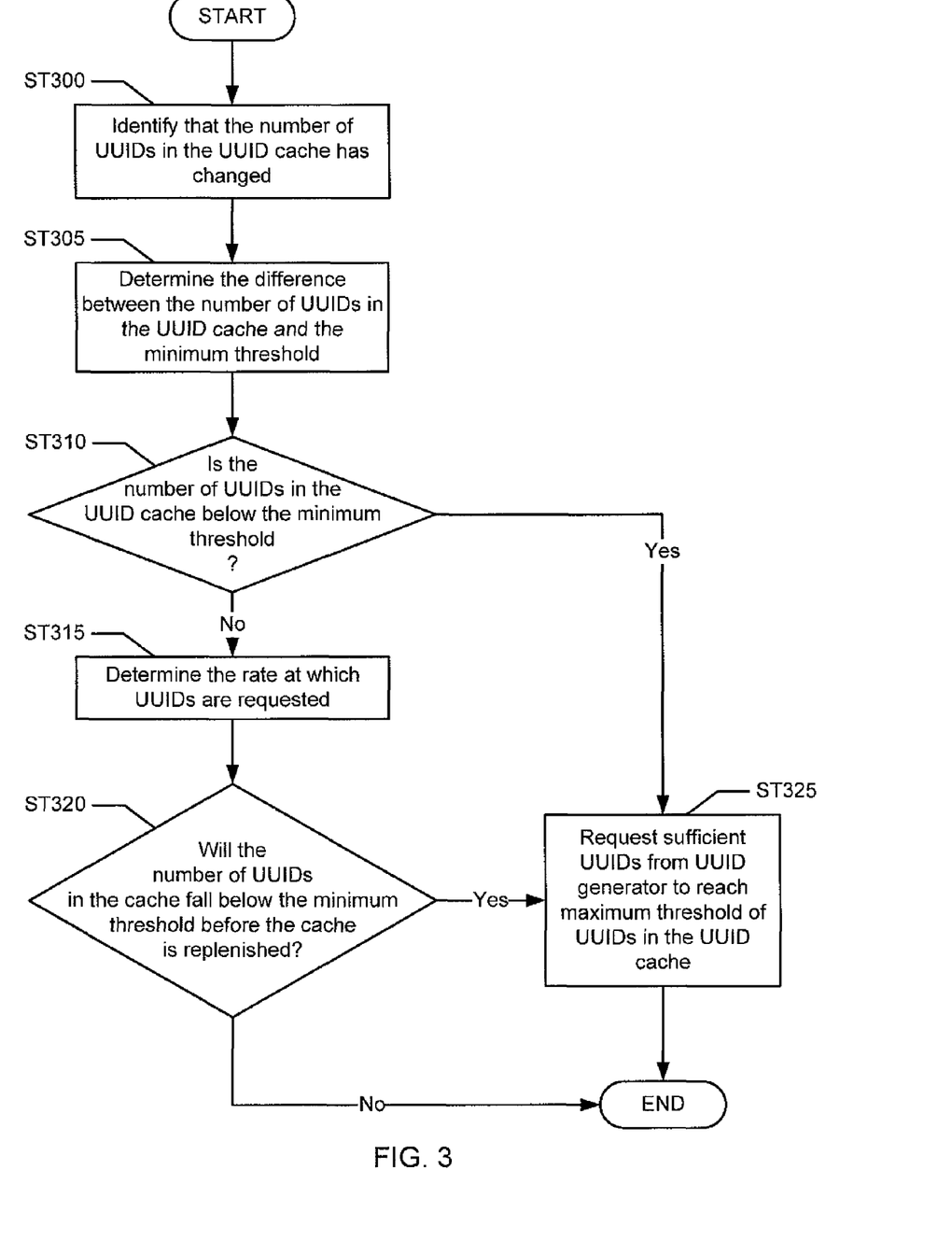

FIG. 3 shows a flowchart in accordance with one or more embodiments of the invention. Specifically, FIG. 3 describes a method for replenishing UUIDs in a UUID Cache. While the various steps in this flowchart are presented and described sequentially, one of ordinary skill will appreciate that some or all of the steps may be executed in different orders, may be combined or omitted, and some or all of the steps may be executed in parallel. In addition, steps such as store acknowledgements have been omitted to simplify the presentation.

At Step 300, a determination is made that the number of UUIDs in the UUID Cache has changed. According to one or more embodiments of the invention, the UUID Caching Mechanism monitors the UUID Cache and determines, for instance, that the number of UUIDs stored in the UUID cache has changed (i.e., UUIDs have been removed from the UUID Cache).

At Step 305, the difference between the number of UUIDs in the UUID Cache and the low threshold number of UUIDs is determined. According to one or more embodiments of the invention, the UUID Caching Mechanism determines this difference. At Step 310, a determination is made about whether the number of UUIDs stored in the UUID Cache is below a low threshold (or reaches a number near the low threshold).

When the number of UUIDs stored in the UUID Cache is below the low threshold number (or reaches a number near the low threshold), at Step 325, the UUID Module requests UUIDs from a UUID Generator to replenish the UUIDs in the UUID Cache. The UUID Module may request enough UUIDs to reach the high threshold or to reach another number between the low and high threshold.

Returning to Step 310, when the number of UUIDs in the UUID Cache has not fallen below a low threshold, then the flowchart continues at Step 315. At Step 315, the rates at which the UUIDs have been historically requested (i.e., the historical rate(s)) are determined (or obtained). At Step 320, a determination is made whether the number of UUIDs will fall below the low threshold of UUIDs required to be stored in the UUID cache at a time before the UUID Generator can replenish the UUIDs (assuming no change in the current rate at which the UUIDs are being generated). According to one or more embodiments of the invention, this determination may be made to ensure that either the number of UUIDs stored in the UUID Cache never falls below some threshold number and/or that the UUID Cache is never empty. Accordingly, the low threshold used in Step 310 may be used, or another value may be used (i.e., the number of UUIDs stored in the cache may fall below the low threshold, but will never be empty).

If a determination is made in Step 320 that the number of UUIDs in the UUID Cache will not fall below a low threshold (or another value), then the process ends. According to one or more embodiments of the invention, after this Step, the UUID Caching Mechanism will continue to monitor the number of UUIDs stored in the UUID Cache until it is determined that the number of UUIDs stored in the UUID Cache has changed. At that time, the process will begin again at Step 300.

If a determination is made in Step 320 that the number of UUIDs stored in the UUID Cache will fall below a low threshold (or another value) required to be stored in the UUID Cache at a given time, then the process continues at Step 325. Further, returning to Step 310, if the number of UUIDs stored in the UUID cache is found to be below the low threshold (or another value) of UUIDs to be stored in the UUID Cache at a given time, the process also continues at Step 325. In both of these scenarios, the UUID cache is found to an insufficient number of UUIDs stored.

At Step 325, a request is made for sufficient UUIDs from the UUID Generator to reach a high threshold (or another value) of UUIDs in the UUID cache. According to one or more embodiments of the invention, this high threshold may be the largest number of UUIDs stored in the UUID cache at any given time. When the requested UUIDs are received by the UUID Generator are received, the UUID Cache has been replenished.

According to one or more embodiments of the invention, the UUID Module may interface with the UUID Generator to replenish the UUID Cache using a single thread or multiple threads. When multiple threads are used, the threads may execute concurrently. Further, because the method for replenishing UUIDs in the UUID Cache is implemented using at least one thread, and the method for providing UUIDs to requesting applications are implemented using at least one other thread, these threads also may execute concurrently. Accordingly, while the UUID Module is providing UUIDs to requesting applications, the UUID Cache may be concurrently replenished.

Figure 4:
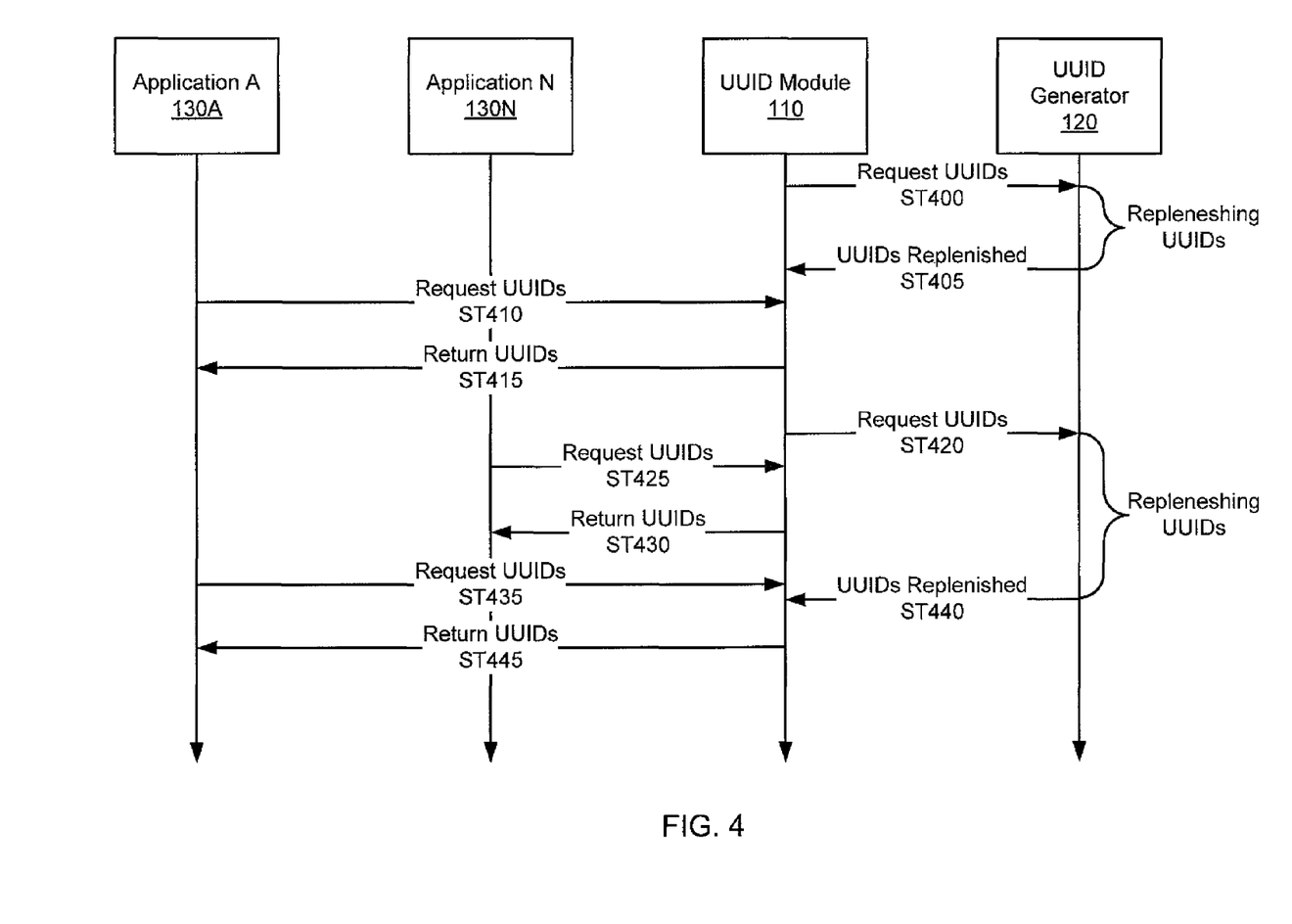
FIG. 4 shows an example in accordance with one more embodiments of the invention.

FIG. 4 shows an example flow diagram of a method for providing UUIDs to requesting applications and replenishing UUIDs in a UUID Module. Those skilled in the art will appreciate that the following examples are for illustrative purposes only and are not intended to limit the scope of the application.

Consider a scenario in which there are two applications, Application A (130A) and Application N (130N) require UUIDs during execution and obtain the UUIDs from the UUID Module in accordance with one or more embodiments of the invention.

At Step 400, the UUID module (110) requests UUIDs from the UUID Generator (120). At Step 405, the UUID Generator (120) completes returning UUIDs to the UUID module and the UUID Cache is replenished.

At Step 410, Application A (130A) requests UUIDs from the UUID Module (110). In the example shown, the UUID Cache has been replenished between Step 400 and Step 405, thus, there are sufficient UUIDs to send the requested UUIDs from the UUID Module (110) to the requesting application, Application A. In Step 415, the requested UUIDs are returned form the UUID Module (110) to Application A (130A). Because the requesting application sends the request to the UUID Module (110) instead of the UUID generator, the turn-around time is faster than it would be if Application A (130A) sent the request to the UUID Generator (120) and waited for the UUID Generator (120A) to generate and send the UUIDs.

Continuing with the example, assume that after sending the requested UUIDs to Application A in Step 415, the UUID Cache in the UUID Module (110) is depleted. In response to this, the UUID Caching Mechanism detects that the UUID Cache needs to be replenished. At Step 420, the UUID Module (110) sends a request to the UUID Generator (120) to replenish the UUIDs. As described above, the UUID Module may send a request for UUIDs to the UUID generator (120) when the number of UUIDs in the UUID cache reaches a low threshold or the UUID Module anticipates (based on at least, in part, on the historical rate of UUID generation and the historical rate of UUID usage in the system that the number of UUIDs in the cache will soon fall below the low threshold. Further, the UUID Module (110) may send the request at Step 420 while there was still some UUIDs available in the UUID Cache (i.e., the number of UUIDs in the UUID Cache had fallen below the low threshold, but was not zero). Though not shown in FIG. 4, upon receipt of the request in Step 420, the UUID Generator (120) begins to generate the UUIDs and send the generated UUIDs back to the UUID Module as they are generated.

Before the UUID Generator (120) concludes replenishing the UUIDs in the UUID Cache, Application B (130N) sends a request for UUIDs to the UUID Module (110) at Step 425. For the purposes of this example, assume that the number of UUIDs present in the UUID Cache at the time of the request is sufficient to allow UUIDs to be returned at ST430.

At Step 430, the UUID Module (110) sends requested UUIDs back to the requesting application, Application B (130N). At Step 435, Application A sends another request for UUIDs to the UUID Module (110). At Step 440, the UUID Generator (120) completes the process of replenishing the UUIDs in the UUID Cache. Finally, at Step 455, the UUID Module sends the requested UUIDs to Application A (130A). As shown in the above example, the activity between the UUID Module (110) and the UUID Generator (120) has no impact on Application A (130A) requesting UUIDs from the UUID Module (110).

According to one or more embodiments of the invention, the UUID Module allows a user to implement a UUID Generator that generates UUIDs with a high degree of randomness, even if the algorithm implemented by that UUID generator is costly with respect to time. Accordingly, the UUID module allows for applications to efficiently obtain UUIDs in a system.

According to one or more embodiments of the invention, the UUID Module allows a set of UUIDs to be cached and made available to applications upon request. Accordingly, when an application requests one or more UUIDs, the application need not wait for the UUIDs to be generated, as the cache already has UUIDs available for the application.

The following is another example according to one or more embodiments of the invention. In the following example, the variable "LOW_WATER_MARK" represents the low threshold. The variable "HIGH_WATER_MARK" represents the high threshold.

```
public class RandomGenerator {
    private boolean generating = false;
    private static RandomGenerator _singletonInstance =
    new RandomGenerator( );
    private static ConcurrentLinikedQueue<String>
    randomNumberList = new
        ConcurrentLinikedQueue<String>( );
    private static ReentrantLock myLock = new ReentrantLock( );
    private static Condition myCondition = myLock.newCondition( );
    private static int LOW_WATER_MARK = 1000;
    private static int REZIE_QUANTITY = 1500;
    private static int HIGH_WATER_MARK = 4000;
    private boolean isShutdown = false;
    private static long WAIT_TIME = 1000;
    public void start( ){
```

-continued

```
      (new RandomSourceThread( )).start( );
   }
   public static RandomGenerator getInstance( ) {
      return _singletonInstance;
   }
   public String randomUUID( ){
      String random = randomNumberList.poll( );
         if ((randomNumberList.size( ) < LOW_WATER_MARK)
            && !generating){
         myLock.lock( );
         generating = true;
         try{
            myCondition.signal( );
         }finally {
            myLock.unlock( );
         }
      }
      return random;
   }
   public void shutdown( ){
      isShutdown = true;
      // myCondition.signal( );
   }
   private class RandomSourceThread extends Thread {
      @Override
      public void run( ) {
         try {
            myLock.lock( );
            for (int i = randomNumberList.size( );
               i < HIGH_WATER_MARK; i++) {
               randomNumberList.offer(UUID.randomUUID( ).toString( ));
            }
            while (!isShutdown) {
               try {
                  for (int i = 0; i < REZIE_QUANTITY; i++) {
                     randomNumberList.offer(UUID.
                        randomUUID( ).toString( ));
                  }
                  // System.out.println("GENERATED " +
                  HIGH_WATER_MARK );
                  //myCondition.await(WAIT_TIME,
                  TimeUnit.MILLISECONDS);
                  generating = false;
                  myCondition.await( );
               } catch (InterruptedException ex) {
                  // ex.printStackTrace( );
               }
            }
         } finally {
            myLock.unlock( );
         }
      }
   }
}
```

The following is an example of an implementation of one or more embodiments. The example is not intended to limit the scope of the invention. Turning to the example, consider an implementation of an IP Multimedia Subsystem (IMS), which is configured to deliver Internet Protocol (IP) multimedia services over mobile networks (e.g., 3G networks, 4G networks, etc.).

The IMS includes one or more application servers, which host and execute services, for example, a Session Initiation Protocol (SIP) service. SIP is a signaling protocol, used for setting up and closing down multimedia communication sessions such as voice and video calls over networks such as the Internet. In addition, SIP may be used for other communication applications such as video conferencing, streaming multimedia distribution, instant messaging, presence information and online games. Thus, the SIP service provides SIP functionality to other components in the IMS as well as other external SIP clients (e.g., devices communicating using instant messaging applications).

The SIP service may include a UUID module and be operatively connected to a UUID generator. Further, requests for UUIDs may be received from SIP clients for UUIDs. The SIP clients may use the UUIDs as part of, for example, the call-id, branch-id, and the session-id. The UUID module may operate in accordance with one or more embodiments of the invention to efficiently provide UUIDs to all SIP clients requesting UUIDs.

Figure 5:
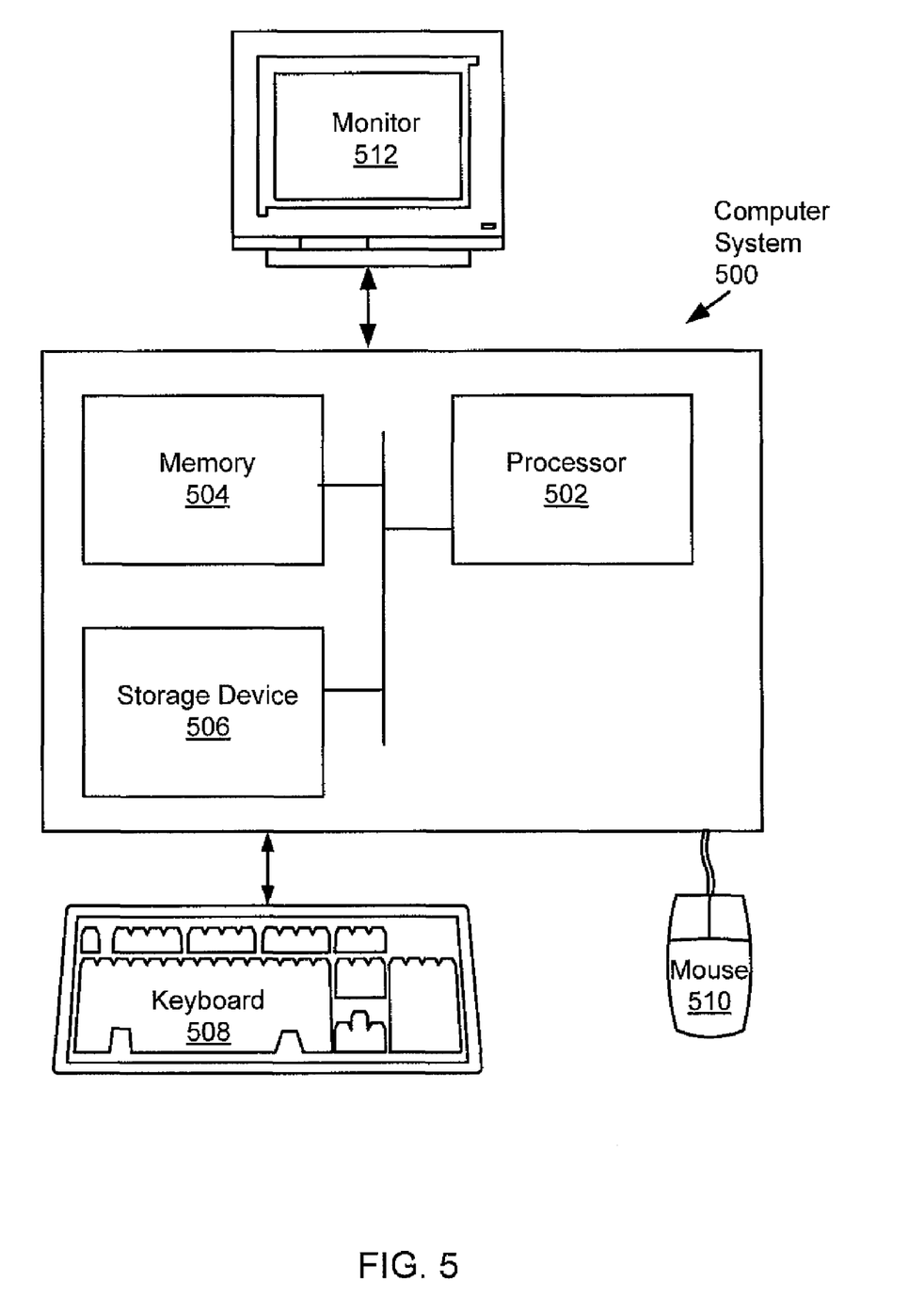
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more processor(s) (502), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
   a universally unique identifier (UUID) cache, wherein the UUID cache is located on a computer readable storage medium and is configured to store a plurality of UUIDs; and
   a UUID caching mechanism, wherein the UUID caching mechanism is configured to:

replenish UUIDs in the UUID cache using a first thread by:
  monitoring the number of UUIDs stored in the UUID cache,
  determining that the number of UUIDs stored in the UUID cache is less than a first threshold,
  requesting a first set of UUIDs from a UUID generator,
  receiving the first set of UUIDs from the UUID generator, and
  storing the first set of UUIDs received from the UUID generator in the UUID cache; and
provide a second set of UUIDs to a first application of a plurality of applications using a second thread, wherein at least one of the UUIDs in the second set of UUIDs is from the first set of UUIDs, and wherein the first thread and the second thread execute concurrently.

2. The system of claim 1, wherein:
each UUID in the UUID cache is unique.

3. The system of claim 1, wherein the UUID caching mechanism is further configured to:
provide a third set of UUIDs to a second application of the plurality of applications using a third thread,
wherein the second thread and the third thread execute concurrently.

4. The system of claim 1, wherein the first threshold is a minimum number of UUIDs in the UUID cache at any time.

5. The system of claim 4, wherein the first threshold is determined based on a minimum number of UUIDs required by applications in an application pool, and the time required for the UUID generator to generate new UUIDs, wherein the applications pool comprises the first application.

6. The system of claim 1, wherein the UUID caching mechanism is further configured to replenish the UUID cache by:
identifying a second threshold, wherein the second threshold corresponds to a maximum number of UUIDs stored in the UUID cache;
determining the number of UUIDs required to reach the maximum threshold in the cache based on a current number of UUIDs in the UUID cache; and
requesting the determined number of UUIDs required from the UUID generator.

7. The system of claim 1, wherein the first threshold is determined dynamically using a historical rate of UUIDs required by the first application.

8. A computer readable medium comprising computer readable program code embodied therein, for causing a computer system to:
replenish universally unique identifiers (UUIDs) in a UUID cache using a first thread by:
  monitoring the number of UUIDs stored in the UUID cache,
  determining that the number of UUIDs stored in the UUID cache is less than a first threshold,
  requesting a first set of UUIDs from a UUID generator,
  receiving the first set of UUIDs from the UUID generator, and
  storing the first set of UUIDs received from the UUID generator in the UUID cache; and
provide a second set of UUIDs to a first application of a plurality of applications using a second thread, wherein at least one of the UUIDs in the second set of UUIDs is from the first set of UUIDs, and wherein the first thread and the second thread execute concurrently.

9. The computer readable medium of claim 8, wherein providing the second set of UUIDs to the first application of the plurality of applications using the second thread, comprises:
receiving a request from the first application for the second set UUIDs,
identifying the second set of UUIDs in the UUID cache,
returning the second set of UUIDs from the UUID cache to the first application, and
removing the second set of UUID from the UUID cache.

10. The computer readable medium of claim 8, wherein each UUID in the UUID cache is unique.

11. The computer readable medium of claim 8, further comprising computer readable program code embodied therein, for causing the computer system to:
provide a third set of UUIDs to a second application of the plurality of applications using a third thread, wherein the second thread and the third thread execute concurrently.

12. The computer readable medium of claim 8, wherein the first threshold is a minimum number of UUIDs in the UUID cache at any time.

13. The computer readable medium of claim 12, wherein the first threshold is determined based on a minimum number of UUIDs required by applications in an application pool, and the time required for the UUID generator to generate new UUIDs, wherein the applications pool comprises the first application.

14. The computer readable medium of claim 8, wherein replenishing the UUIDs in the UUID cache further comprises:
identifying a second threshold, wherein the second threshold corresponds to a maximum number of UUIDs stored in the cache;
determining the number of UUIDs required to reach the second threshold in the cache; and
requesting the determined number of UUIDs required from the UUID generator.

15. The computer readable medium of claim 8, wherein the first threshold is determined dynamically using a historical rate of UUIDs required by the first application.

16. A method for providing universally unique identifiers (UUIDs), comprising:
(a) monitoring the number of UUIDs stored in a UUID cache;
(b) determining that the number of UUIDs store in the UUID cache has fallen below a first threshold;
(c) requesting a first set of UUIDs from a UUID generator;
(d) receiving the first set of UUIDs from the UUID generator;
(e) storing the first set UUIDs received from the UUID generator in the UUID cache;
(f) receiving a request from a first application of a plurality of applications for a second set of UUIDs;
(g) identifying the second set of UUIDs in the UUID cache, wherein at least one UUID in the second set of UUIDs in from the first set of UUIDs;
(h) returning the second set of UUIDs from the UUID cache to the first application; and
(i) removing the second set of UUIDs from the UUID cache, wherein:
steps (a)-(e) are performed by a first thread,
steps (f)-(i) are performed by a second thread, and
the first thread and the second thread execute concurrently.

17. The method of claim 16, wherein each UUID in the UUID cache is unique.

18. The method of claim 16, further comprising:
(j) receiving a request from a second application of the plurality of applications for a third set of UUIDs;
(k) identifying a third set of UUIDs in the UUID cache;
(l) returning the third set of UUIDs from the UUID cache to the second application; and
(m) removing the third set of UUIDs from the UUID cache;
wherein steps (j-m) are performed by a third thread,
wherein the first thread, the second thread, and the third thread execute concurrently.

19. The method of claim 16, wherein the first threshold is a minimum number of UUIDs stored in the UUID cache at any time.

20. The method of claim 19, wherein the first threshold is determined based on a minimum number of UUIDs required by applications in an application pool, and the time required for the UUID generator to generate new UUIDs, wherein the applications pool comprises the first application.

* * * * *